United States Patent
Reichstein

Patent Number: 6,154,649
Date of Patent: Nov. 28, 2000

[54] BROADCAST RECEIVER WITH INTEGRATED TELEPHONE UNIT

[75] Inventor: Martin Reichstein, Hildesheim, Germany

[73] Assignee: Robert Bosch GmbH, Stuttgart, Germany

[21] Appl. No.: 09/180,723
[22] PCT Filed: May 16, 1997
[86] PCT No.: PCT/DE97/00993
§ 371 Date: Nov. 13, 1998
§ 102(e) Date: Nov. 13, 1998
[87] PCT Pub. No.: WO97/44910
PCT Pub. Date: Nov. 27, 1997

[30] Foreign Application Priority Data

May 17, 1996 [DE] Germany .................. 196 19 815

[51] Int. Cl.[7] ................................................. H04B 1/00
[52] U.S. Cl. ...................... 455/426; 455/99; 455/527; 455/569
[58] Field of Search ........................... 455/426, 527, 455/99, 569; 381/81, 86, 332

[56] References Cited

U.S. PATENT DOCUMENTS

| | | | |
|---|---|---|---|
| 5,420,931 | 5/1995 | Donner | 381/86 |
| 5,448,620 | 9/1995 | Gershkovich et al. | 379/58 |
| 5,506,578 | 4/1996 | Kish et al. | 340/996 |
| 5,541,980 | 7/1996 | Urewicz | 379/61 |
| 5,635,925 | 6/1997 | Kishi et al. | 340/996 |
| 5,692,058 | 11/1997 | Eggers et al. | 381/107 |
| 5,722,069 | 2/1998 | Donner | 455/418 |
| 5,884,156 | 3/1999 | Gordon | 455/340 |
| 5,910,996 | 6/1999 | Eggers et al. | 381/107 |
| 5,978,689 | 11/1999 | Tuoriniemi et al. | 455/569 |
| 5,991,637 | 11/1999 | Mack, II et al. | 455/55 |

FOREIGN PATENT DOCUMENTS 40 09 899 C1  8/1991  Germany.

Primary Examiner—Reinhard J. Eisenzopf
Assistant Examiner—Makoto Aoki
Attorney, Agent, or Firm—Michael J. Striker

[57] ABSTRACT

A radio receiver with an integrated telephone device (1) is proposed, which is used for switching of loudspeakers (20, 21, 22, 23) between radio reception and telephone reception. In the telephone mode the loudspeakers (20, ..., 23), which can be connected to the radio receiver, are switched to telephone reception, and when a preset signal is received by the radio receiver, preferably an information signal for traffic reports which has been modulated on a 57 kHz auxiliary carrier, the loudspeakers (20, ..., 23) are partially switched over to radio reception. In the radio reception mode the loudspeakers (20, ... 23), which can be connected to the radio receiver, are switched to radio reception, and in case of a loop allocation in the telephone device (1) for receiving an incoming and/or outgoing call, the loudspeakers (20, ..., 23) are at least partially switched over to telephone reception. Switching of the loudspeakers (20, ..., 23) can take place by means of a control circuit; (5), which additionally is used for acoustically processing audio signals. Various preset allocations of the loudspeakers (20, ..., 23) to telephone and radio signals can be selected by a user by means of an operating unit (30) connected with the control circuit (5).

4 Claims, 2 Drawing Sheets

BROADCAST RECEIVER WITH INTEGRATED TELEPHONE UNIT

PRIOR ART

The invention relates to a radio receiver in accordance with the species of the main claims.

A motor vehicle communications center is known from DE 40 09 899 C1, which is used for the common operation of a car telephone and a car radio. The motor vehicle communications center comprises further connections for devices being used in the interior of the motor vehicle. When receiving a telephone call, the remaining devices connected with the center are automatically switched off by the cradle switch. When lifting the receiver of the car telephone, all sources of interfering noise are switched off the moment it is lifted off, and are only switched on again when the receiver is put down. In this connection the car radio is also considered as a source of interfering noise.

ADVANTAGES OF THE INVENTION

In contrast to this, the radio receiver with the characteristics of independent claim 1 has the advantage that it is not necessary to switch all speakers to telephone reception during telephone operations, but the simultaneous radio reception and telephone reception via the loudspeakers is possible instead. In this way, during telephone operation the user does not lose information sent by radio at the same time.

It is furthermore advantageous that the partial switching of the loudspeaker to radio reception takes place automatically as the function of the reception of a preset signal by means of the radio receiver. It is possible in this way to limit the partial switching of the loudspeaker to radio reception to those cases in which particularly important information is broadcast by radio and is therefore recognized by an identifying signals. In this way the telephone operation is only "interfered with" in case of particularly important information broadcast by radio.

A further advantage lies in that switching takes place automatically, by which the operation of the radio receiver is considerably simplified.

An advantageous further development and improvement of the radio receiver disclosed in independent claim 1 is possible by the step mentioned in dependent claim 2.

Switching as a function of the detection of an identifying signal regarding traffic information is advantageous here. When using the radio receiver in a motor vehicle, the user is informed in this way of the actual traffic conditions even when operating the telephone.

The radio receiver in accordance with the invention having the features of independent claim 3 has the advantage that, in case of a loop allocation during radio receiving operations, 4 loudspeakers are switched at least partially to telephone reception. In this way the user can simultaneously listen to the radio and use the telephone. In addition, here, too, the advantage of automatic switching leads to a considerable simplification of the operation of the radio receiver. The advantage of switching all loudspeakers in case of a loop allocation resides in that the telephone operation is not "interfered with" by the radio reception, wherein the user himself need not switch off the radio reception.

Advantageous further developments and improvements of the radio receiver disclosed in independent claims 1 and 2 are possible by the steps mentioned in dependent claims 4 to 6.

In accordance with claim 4, it is advantageous that different preset allocations of telephone and radio signals to the loudspeakers can be switched in. A variable assignment of the telephone and radio signals to the different loudspeakers is possible in this way and can be individually selected by the user.

It is furthermore advantageous that, following a selection of a preset allocation, a switching process can be initiated by means of an operating unit. In this way the user can switch around a set assignment of the telephone and radio signals to the respective loudspeakers in accordance with his requests.

DRAWINGS

An exemplary embodiment of the invention is represented in the drawings and will be explained in greater detail in the following description. Shown are in:

FIG. 1, a block circuit diagram of a radio receiver with an integrated telephone installation and a control circuit, and in FIG. 2, a flow chart of the mode of functioning of the control circuit.

DESCRIPTION OF THE EXEMPLARY EMBODIMENT

Figure 1:
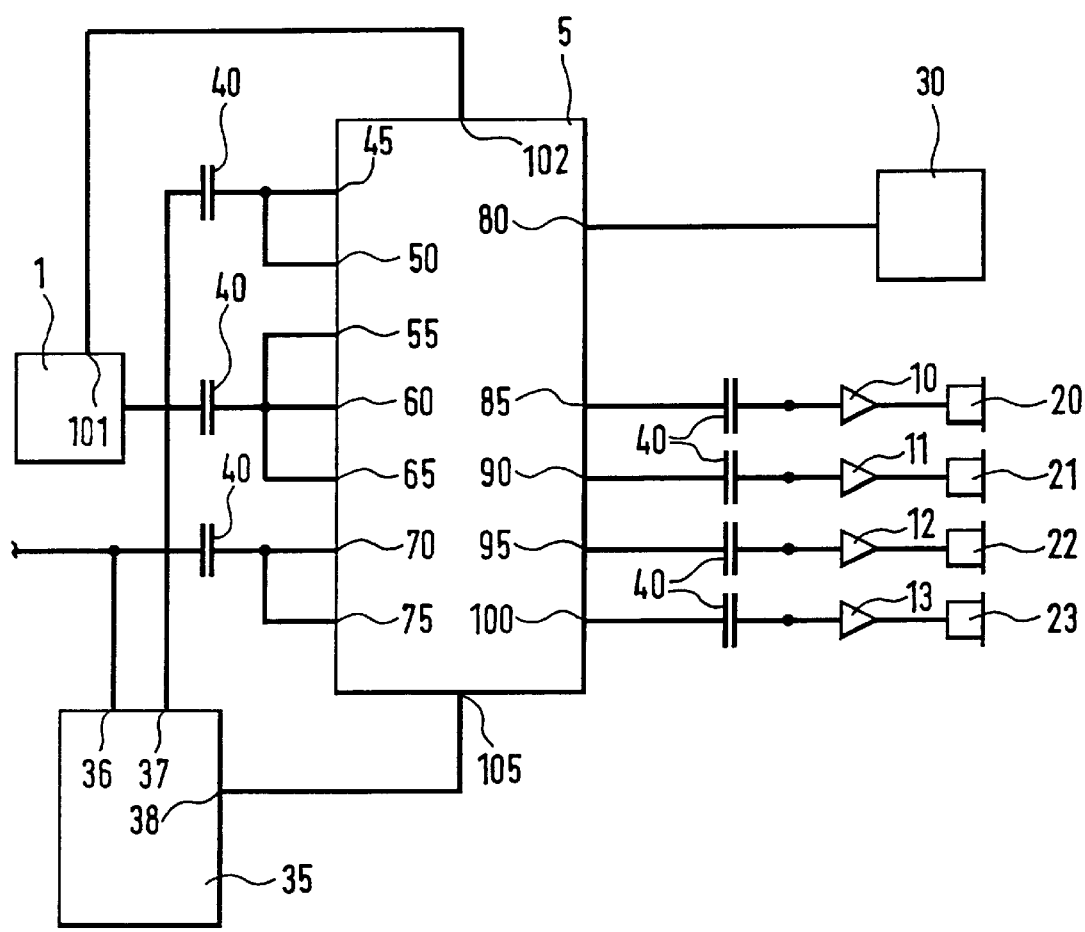

FIG. 1 shows the circuit diagram of a radio receiver with an integrated telephone device 1 which, for example, is used in motor vehicles. In the said example, the telephone device 1 is embodied as a mobile radio device. The radio receiver has a reception element 35. The reception element 35 is used for receiving and demodulating FM radio signals. The reception element 35 has two outputs 36 and 37 for stereo reception, wherein VF radio signals of the left stereo channel are present at the first output 36, and VF radio signals of the right stereo channel are present at the second output 37. Following demodulation, VF telephone signals are present at the output of the telephone device 1 during telephone operation. The radio receiver furthermore has a control circuit 5. The control circuit 5 has three inputs 45, 50 and 55 for right stereo channels and three inputs 65, 70 and 75 for left stereo channels, as well as a mono input 60. It is possible in this way to connect maximally three stereo sources and one mono source to the control circuit 5. The control circuit 5 is connected via a data bus to an operating unit 30 by means of an operating device input/output 80. The control circuit 5 has four outputs 85, 90, 95 and 100 for triggering respectively one output stage 10, 11, 12 and 13. Four loudspeakers 20, 21, 22, 23 which, in the above mentioned example are distributed at the left front, right front, left rear and right rear of the interior of the motor vehicle, are triggered by the output stages 10, 11, 12, 13. Here, the first output 85 is connected via the first output stage 10 with the first loudspeaker 20 at the left front. The second output 90 is connected via the second output stage 11 with the second loudspeaker 21 at the right front. The third output 95 is connected via the third output stage 12 with the third loudspeaker 22 at the left rear. The fourth output 100 is connected via the fourth output stage 13 with the fourth loudspeaker 23 at the right rear. A coupling capacitor 40 for suppressing the DC component is respectively switched between the four outputs 85, 90, 95 and 100 and the four output stages 10, 11, 12, 13. The output of the telephone device 1 is connected via a coupling capacitor 40 for suppressing the DC component with the third input 55 for the right stereo channels, with the first input 65 for the left stereo channels and with the mono input 60 of the control circuit 5. The first output 36 of the receiving element 35 is also connected via a coupling capacitor 40 for suppressing the DC component with the second and the third input 70 and 75 of the control circuit 5 for the left stereo channels. The second output 37 of the receiving element 35 is connected via a coupling capacitor 40 for suppressing the DC component with the first and the second input 45 and 50 of the control circuit 5 for the right stereo channels. In addition, the receiving element 35 has a third output which is used for transmitting an identifying signal for traffic reports and which is connected with a first identifying signal input 105 of the control circuit 5. The telephone device 1 has an output 101 for transmitting an identifying signal for a loop allocation, which is connected with a second identifying signal input 102 of the control circuit 5.

A telephone conversation can be received on all four speakers 20, . . . , 23 via the mono input 60 of the control circuit 5. Wiring together the third input 55 of the control circuit 5 for the right stereo channels with the output of the telephone device 1 makes possible accessing only the right loudspeakers 21 and 23 with telephone signals, wiring together the first input 65 of the control circuit 5 for the left stereo channels with the output of the telephone device 1 makes possible accessing only the left loudspeakers 20 and 22 with telephone signals. Thus, the telephone device 1 is used as a mono, as well as a pseudo stereo source. Thus two stereo sources and one mono source are connected with the telephone device 1 and the FM tuner. The still free stereo inputs are also wired together with the outputs 36 and 37 of the receiving element 35, so that they do not have an undefinable potential. However, it would be conceivable in further exemplary embodiments to wire the remaining pair of stereo inputs together with a further stereo source. This could be a CD changer, for example.

The control circuit 5 allows the switching of various predetermined allocations of the speakers 20, . . . , 23 to telephone and radio signals. For example, the left loudspeakers 20 and 22 can be allocated to radio signals of the left stereo channel, and the right loudspeakers 21 and 23 to radio signals of the right stereo channel. Furthermore, the allocation of the left loudspeakers 20 and 22 to radio signals of the left stereo channel, and the allocation of the right loudspeakers 21 and 23 to telephone signals is possible. It is analogously possible to switch telephone signals to the left loudspeakers 20 and 22, and radio signals to the right loudspeakers 21 and 23. Finally, wiring all loudspeakers 20, . . . , 23 with telephone signals is possible, preferably by using the mono input 60 of the control circuit 5. The various preset allocations of the loudspeakers 20, . . . , 23 can be selected by the user by means of the operating unit 30, wherein the switching process required for the selected allocation of the loudspeakers 20, . . . , 23 can then be initiated by the control circuit 5.

Figure 2:
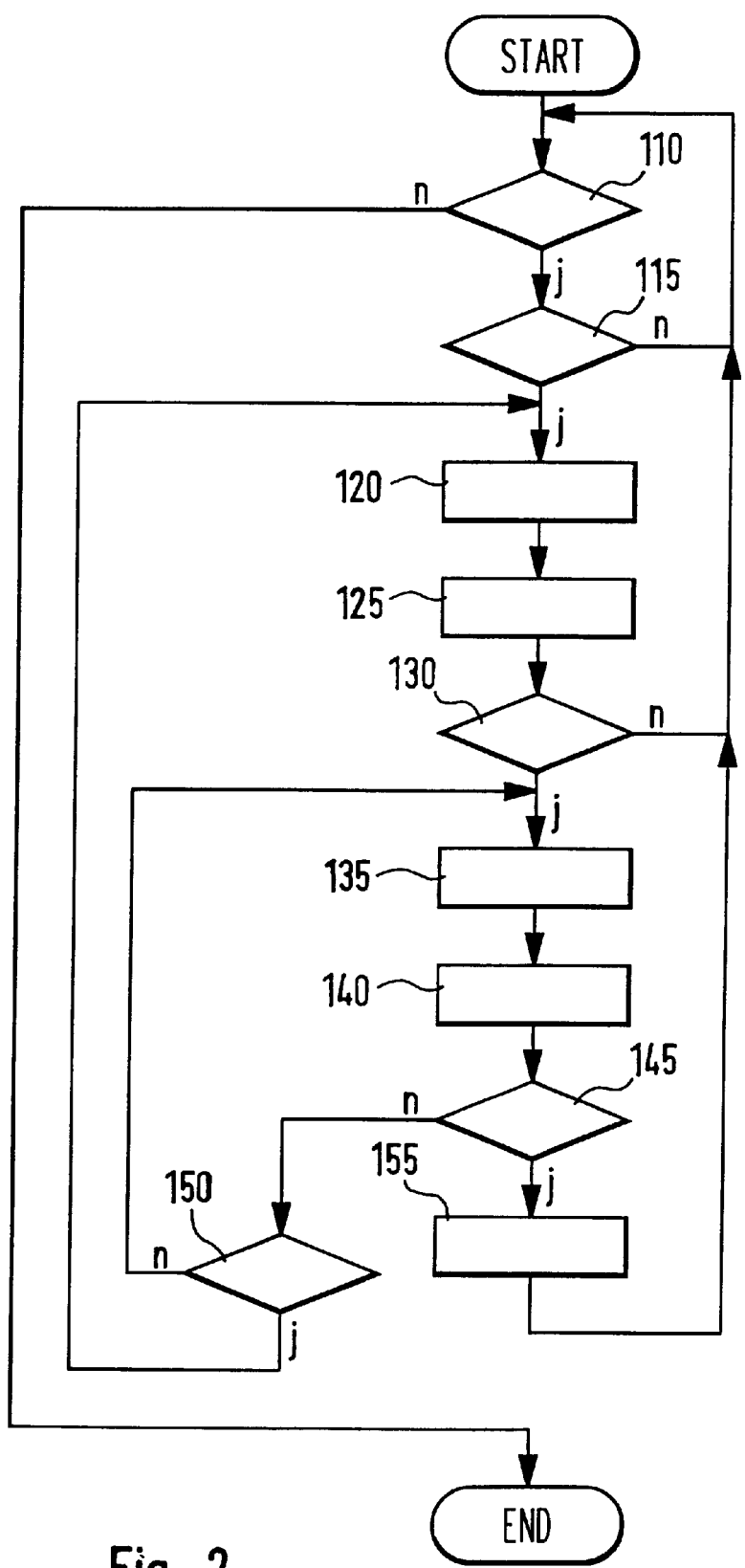

The mode of functioning of the control circuit 5 is described by means of a flow chart in accordance with FIG. 2. After switching on the radio receiver, a check is made at program point 110 whether radio signals are present at one of the inputs 45, 50, 70, 75, which are connected with the receiving stages 35, of the control circuit 5. If this is the case, a jump to the program point 115 is made, otherwise an exit from the program portion is made. A check is made at the program point 115, whether there is a loop allocation in the telephone device 1, i.e., whether an appropriate identification signal is present at the second identification signal input 102 of the control circuit 5. If this is the case, a jump to the program point 120 is made, otherwise a jump to the program point 110 is made. At the program point 120 an interrogation of the operating unit 30 is performed regarding an allocation request for the loudspeakers 20, . . . , 23. The desired allocation is switched on by the control circuit 5 at the program point 125. If there is no allocation request by the user present at the operating unit 30, all four loudspeakers 20, . . . , 23 are switched to telephone signals. A check is made at the program point 130 whether a preset identification signal is present at the first identification signal input 105 of the control circuit 5. If in the course of this an identification signal, broadcast by radio and modulated on a 57 kHz auxiliary carrier, for traffic reports in accordance with the RDS or ARI system is detected after demodulation in the receiving element 35 at the first identification signal input 105 of the control circuit 5, a jump is made to the control point 135, otherwise a jump is made to the control point 110. At the program point 135 an interrogation of the operating unit 30 is performed regarding an allocation request for the loudspeakers 20, . . . , 30. At the program point 140 the allocation of the loudspeakers 20, . . . , 23 selected by the user in the operating unit 30 is switched on by the control circuit 5. If there is no allocation request of the user present at the operating unit 30, the traffic reports are received in the left loudspeakers 20 and 22, and the telephone signals in the right loudspeakers 21 and 23. It is of course alternatively possible to receive the traffic reports in the right loudspeakers 21 and 23, and the telephone signals in the left loudspeakers 20 and 22. A check is made at the program point 145 whether the loop allocation continues to be present in the telephone device 1, i.e. whether the appropriate identification signal continues to be present at the second identification signal input 102 of the control circuit 5. If this is the case, a jump to the program point 150 is made. A check is made at the program point 150 whether the traffic report has ended, i.e. Whether the identification signal is still present at the first identification signal input 105 of the control circuit 5. If this is not the case, a jump is made to the control point 120, otherwise a jump to the program point 135 is made. But if the traffic reports still continue, a new interrogation of the operating unit 30 is made, whether the allocation should be changed. But if the traffic reports are over, an interrogation of the operating unit 30 is again performed regarding the allocation of the loudspeakers 20, . . . , 23 which, when there is no allocation request, are all switched to telephone reception at the program point 125. At the program point 155, i.e. at the end of the loop allocation, switching of the allocation of all loudspeakers 20, . . . , 23 to radio reception takes place. Thereafter, a jumo is made to the program point 110, and the function loop is again travelled.

Besides the distribution of the audio signals to the various loudspeakers 20, . . . , 23, the control circuit 5 is also used for the acoustic processing of the audio signals, i.e. for setting loudness and/or tone and/or the geometry of the audio signals.

In a further exemplary embodiment, the control circuit can also have an additional "mute" input, which makes muting by means of a software control possible in order to blend out interfering crackling during the switching around of the loudspeakers 20, . . . , 23.

In case of the additional employment of the above mentioned CD changer as the third stereo source, CD reception and telephone reception can be mixed by the control circuit 5, i.e. they can be simultaneously received by means of the appropriate allocation of the loudspeakers 20, . . . , 23. Mixing of CD signal and radio signals is also possible.

In further exemplary embodiments it is possible to connect stereo and mono sources other than the ones described to the control circuit 5 and to mix them by means of the control circuit 5. Connection of TV receivers is also possible.

In accordance with a further exemplary embodiment, the intelligence of the control circuit 5 can also be housed in the operating unit 30, wherein the operating unit 30 is additionally respectively connected with the receiving element 35 and the telephone device 1 via a data bus.

In this case the detection of an identification signal for traffic reports and of loop allocation in the telephone device 1 takes place via the respective data bus in the operating unit 30, which actuates the control circuit 5 to switch the allocation of the loudspeakers 20, . . . , 23, or respectively to mix the radio signals and the telephone reception signals.

What is claimed is:

1. A radio receiver with an integrated telephone device (1), characterized in that in the telephone mode the loudspeakers (20, 21, 22, 23), which can be connected to the radio receiver, are switched to telephone reception, and that when a preset signal is received by the radio receiver, the loudspeakers (20, 21, 22, 23) are partially switched over to radio reception.

2. The radio receiver in accordance with claim 1, characterized in that switching takes place as a function of the detection of at least one information signal for traffic reports, which is broadcast by radio and preferably has been modulated on a 57 kHz auxiliary carrier.

3. A radio receiver with an integrated telephone device (1), characterized in that in the radio reception mode the loudspeakers (20, 21, 22, 23), which can be connected to the radio receiver, are switched to radio reception, and that in case of a loop allocation in the telephone device (1) for receiving an incoming and/or outgoing call, the loudspeakers (20, 21, 22, 23) are at least partially switched over to telephone reception.

4. The radio receiver in accordance with claim 1, characterized in that various preset allocations of the loudspeakers (20, 21, 22, 23) to telephone and radio signals can be made, and that after a preset allocation a switching process can be initiated by means of an operating unit (30).

\* \* \* \* \*